US012679107B2

(12) United States Patent
Yu et al.

(10) Patent No.: US 12,679,107 B2
(45) Date of Patent: Jul. 14, 2026

(54) THERMAL TRANSFER PRINTING METHOD, PRINTER, AND READABLE STORAGE MEDIUM

(71) Applicant: ZHUHAI QUIN TECHNOLOGY CO., LTD., Zhuhai (CN)

(72) Inventors: Degang Yu, Zhuhai (CN); Xiaowei Wang, Zhuhai (CN); Jinpeng Guo, Zhuhai (CN)

(73) Assignee: ZHUHAI QUIN TECHNOLOGY CO., LTD., Zhuhai (CN)

( * ) Notice: Subject to any disclaimer, the term of this patent is extended or adjusted under 35 U.S.C. 154(b) by 207 days.

(21) Appl. No.: 18/614,767

(22) Filed: Mar. 25, 2024

(65) Prior Publication Data

US 2025/0144944 A1 May 8, 2025

(30) Foreign Application Priority Data

Nov. 2, 2023 (CN) ......................... 202311455700.5

(51) Int. Cl.

| | |
|---|---|
| ***B41J 3/407*** | (2006.01) |
| ***B41J 2/325*** | (2006.01) |
| ***B41J 11/00*** | (2006.01) |
| ***B41J 25/20*** | (2006.01) |

(52) U.S. Cl.

CPC ............... *B41J 3/407* (2013.01); *B41J 2/325* (2013.01); *B41J 11/0005* (2013.01); *B41J 25/20* (2013.01); *B41J 2203/01* (2020.08)

(58) Field of Classification Search

CPC . B41J 3/60; B41J 11/008; B41J 2/2135; B41J 11/46; B41J 2/32; B41J 2/325; B41J 2/355; B44C 1/105; Y10S 428/914; B41M 3/12; B41M 5/0256

See application file for complete search history.

(56) References Cited

U.S. PATENT DOCUMENTS

| | | | | |
|---|---|---|---|---|
| 1,627,407 | A * | 5/1927 | Reese | B44C 1/175 428/207 |
| 4,590,490 | A * | 5/1986 | Takanashi | B41J 2/355 347/176 |
| 6,074,721 | A * | 6/2000 | Moore | B41M 3/12 606/186 |
| 6,793,999 | B2 * | 9/2004 | Wittmeyer, Jr. | B44C 1/1712 428/41.3 |
| 10,926,557 | B2 * | 2/2021 | McLaughlin | B41J 11/0095 |

(Continued)

*Primary Examiner* — John P Zimmermann

(57) ABSTRACT

A thermal transfer printing method, a printer, and a readable storage medium are provided. The thermal transfer printing method includes acquiring pattern data, obtaining side line data of two side lines, and controlling a print head to print according to the side line data and the pattern data. The printer includes a processor. The processor is configured to implement the thermal transfer printing method by executing computer programs stored in a memory. The readable storage medium includes the computer programs stored therein. The computer programs are executed by a processor to implement the thermal transfer printing method. A print head heats up and transfers heat to two opposite sides of a transfer paper layer, thereby melting dye and attaching the dye to two opposite sides of the pattern printed on a base paper layer. Therefore, balanced force on two opposite sides of the tattoo transfer paper is realized.

20 Claims, 5 Drawing Sheets

(56) References Cited

U.S. PATENT DOCUMENTS

| | | | | |
|---|---|---|---|---|
| 2008/0019727 | A1* | 1/2008 | Honma | G03G 15/234<br>399/82 |
| 2012/0081426 | A1* | 4/2012 | Rossell | B41J 3/60<br>347/16 |
| 2013/0293613 | A1* | 11/2013 | Berel | B41J 11/46<br>347/14 |
| 2017/0136807 | A1* | 5/2017 | Kilmer | B44C 1/105 |
| 2018/0015754 | A1* | 1/2018 | Vicente Vicente | B41J 29/393 |

* cited by examiner

THERMAL TRANSFER PRINTING METHOD, PRINTER, AND READABLE STORAGE MEDIUM

TECHNICAL FIELD

The present disclosure relates to a field of printing technology, and in particular to a thermal transfer printing method, a printer, and a readable storage medium.

BACKGROUND

There is technology available to print tattoo transfer paper using thermal transfer printers.

Tattoo transfer paper mainly comprises a transfer paper layer and a base paper layer. After a printer receives pattern data and starts printing, the tattoo transfer paper is transferred to be placed between a rubber roller and a print head of the printer. Positions of the print head are heated according to the pattern data, so that dye in the transfer paper layer is transferred to the base paper layer, thereby creating a pattern on the base paper layer. A user then is allowed to transfer the pattern on the base paper layer onto the skin to obtain a temporary tattoo.

However, printing of tattoo transfer paper differs from continuous printing of industrial label paper or packaging paper. Tattoo transfer papers are separated from each other and a printing process of each of the tattoo transfer papers is independent from each other. Therefore, the tattoo transfer paper is subject to a tension caused by pulling during the printing process, resulting in the pattern being deformed and distorted, and affecting a user experience when transferring the pattern onto the skin.

SUMMARY

A first purpose of the present disclosure is to provide a thermal transfer printing method that solves a problem of wrinkles on tattoo transfer paper after printing.

A second purpose of the present disclosure is to provide a printer that solves the problem of the wrinkles on the tattoo transfer paper after printing.

A third purpose of the present disclosure is to provide a readable storage medium that solves the problem of the wrinkles on the tattoo transfer paper after printing.

The thermal transfer printing method of the present disclosure comprises steps:

acquiring pattern data;

obtaining side line data of two side lines; and controlling a print head to print according to the side lineside line data and the pattern data.

It is seen from the above embodiment that the present disclosure realizes balanced forces on two opposite sides of the tattoo transfer paper. Specifically, a print head of the printer heats up and transfers heat to two opposite sides of a transfer paper layer of the tattoo transfer paper, thereby melting dye and attaching the dye to two opposite sides of the pattern printed on the base paper layer. During a printing process, symmetrical forces are formed on the two opposite sides of the tattoo transfer paper to ensure clear development of the pattern printed on a middle of the tattoo transfer paper so that stress between the transfer paper layer and the base paper layer of the tattoo transfer paper has good uniformity. The thermal transfer printing method avoids generation of the wrinkles of the tattoo transfer paper after printing, ensures that the pattern is completely restored when transferring the pattern onto the skin, and improves a user experience.

In one optional embodiment, the step of obtaining the side line data of the two side lines comprises: obtaining printing width data and generating the side line data of the two side lines according to the printing width data.

It is understood that the tattoo transfer paper may have different specifications, so the positions of the side lines that need to be printed are different, and the corresponding heating pieces on the print head that need to work to print the two side lines are also different. Therefore, the printing width data may be obtained according to a paper specification selected by the user via an application (APP) on a mobile phone or other terminal device. Then the side line data of the two side lines is generated according to the printing width data of current tattoo transfer paper selected by the user.

In one optional embodiment, the step of obtaining the side line data of the two side lines comprises obtaining printing width data; and generating the side line data of the two side lines according to the printing width data and the pattern data.

In one alternative embodiment, in the step of controlling the print head to print according to the side line data and the pattern data, heating pieces, corresponding to the side line data, of the print head are always spaced apart from heating pieces, corresponding to the pattern data, of the print head.

Since an ultimate purpose of the tattoo transfer paper is to be stick onto the skin of the user for pattern transfer, it is necessary to ensure a certain distance between the two side lines and the pattern. Thus, after obtaining the pattern data, an adjustment is made based on whether intervals between coordinate data of the pattern data and coordinate data of the side line data are greater than a predetermined value. If not, the intervals are controlled to increase, such as offsetting the two side lines or scale down the pattern proportionally. In addition side line areas and a pattern area are predetermined. After the user selects an image, the pattern thereof is recognized and a size of the pattern is automatically adjusted to ensure that the intervals between the pattern and the two side lines are proper.

In one alternative embodiment, the step of controlling the print head to print according to the side line data and the pattern data comprises controlling heating pieces, corresponding to the side line data, of the print head to always work.

By such setting, the stress between the transfer paper layer and the base paper layer is adjusted through printing the two side lines throughout the entire printing process, which further ensures that the tattoo transfer paper remains flat and wrinkle-free after printing.

In one alternative embodiment, the step of controlling the print head to print according to the side line data and the pattern data comprises controlling heating pieces disposed symmetrically on two sides of the print head to work according to the side line data.

By such setting, the two side lines are symmetrically and synchronously printed by corresponding heating pieces. Correspondingly, even the stress changes during the printing process, the forces on the two opposite sides of the tattoo transfer paper remain equal and are balanced, which is conducive to balance of the forces on the two opposite sides of the tattoo transfer paper during the printing process.

In one optional embodiment, after the step of controlling the print head to print according to the side line data and the pattern data, the thermal transfer printing method further comprises respectively printing the two side lines on two opposite sides of a base paper layer of tattoo transfer paper according to the side line data. The two side lines are axially symmetrically disposed In one optional embodiment, the two side lines are straight lines respectively overlapping edges of the two opposite sides of the base paper layer.

The printer of the present disclosure comprises a processor. The processor is configured to implement the thermal transfer printing method mentioned above by executing computer programs stored in a memory.

The readable storage medium of the present disclosure comprises the computer programs stored therein. The computer programs are executed by the processor to implement the thermal transfer printing method mentioned above.

DETAILED DESCRIPTION

Figure 2:
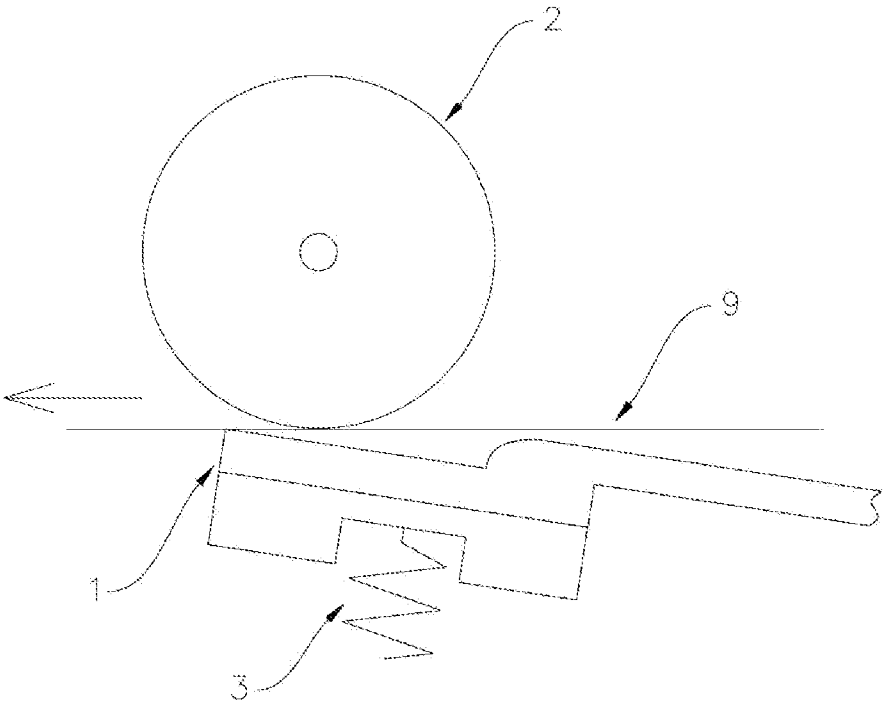
FIG. 2 is a partial schematic diagram of a printer according to one embodiment of the present disclosure.

A thermal transfer printing method of the present disclosure is applied to a printer. The printer is a thermal transfer printer. As shown in FIG. 2, the thermal transfer printer of the present disclosure comprises a print head 1, a rubber roller 2, and springs 3. The printed head 1 is disposed apposite to the rubber roller 2. A paper feeding channel is defined between the print head 1 and the rubber roller 2. The rubber roller 2 is made of a soft rubber material having a Shore hardness of 41 degrees. The springs 3 are disposed at intervals along a length direction of the print head 1 and are disposed between the print head 1 and a main body of the printer. Forces of the springs 3 enable the print head 1 to tend to abut against the rubber roller 2. In this way, when the tattoo transfer paper 9 is in the paper feeding channel, the print head 1 and the rubber roller 2 compress the tattoo transfer paper 9 from two sides of the tattoo transfer paper 9 along a thickness direction thereof.

Figure 3:
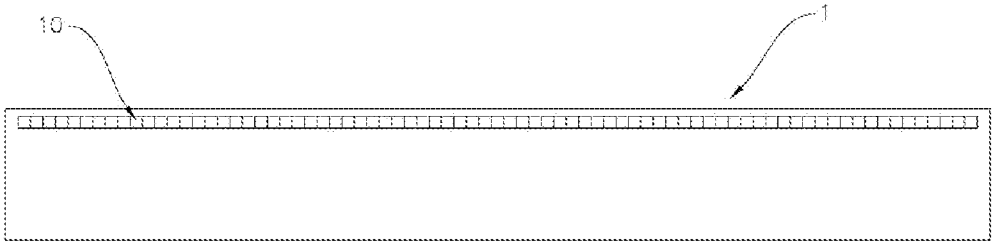
FIG. 3 is a schematic diagram of a print head of the printer according to one embodiment of the present disclosure.

As shown in FIG. 3, the print head 1 comprises heating pieces 10 disposed along a length direction thereof. A quantity of the heating pieces 10 is related to printing pixels. For example, the print head 1 having the print pixels of 300 dpi needs to comprise 300 heating pieces 10. The heating pieces 10 is allowed to be electrically heated.

Of course, the printer further comprises a processor configured to implement the thermal transfer printing method mentioned above by executing computer programs stored in a memory. The processor may be a central processing unit (CPU), a general-purpose processor, a digital signal processor (DSP), an application specific integrated circuit (ASIC), a field-programmable gate array (FPGA) or other programmable logic device, a discrete gate, a transistor logic device, a discrete hardware component, etc. The general-purpose processor may be a microprocessor or a conventional processor, etc.

The memory mainly comprises a program storage area and a data storage area. The program storage area is configured to store application program of an operating system, application programs of at least one function (such as a sound playback function, an image playback function, etc.), etc. The data storage area is configured to store data (such as audio data, phone books, etc.) created based on use of a terminal device (such as a mobile phone, a tablet, a computer, etc.). In addition, the memory may comprise high-speed random access memory, and non-volatile memory (e.g., a hard disk, in internal storage, a plug-in hard disk, a smart memory card (SMC), a secure digital (SD) card, a flash card, at least one disk storage device, a flash memory device, or other volatile solid-state storage device).

Of course, the printer further comprises a wireless module configured to receive data and signals sent by the terminal device.

Figure 4:
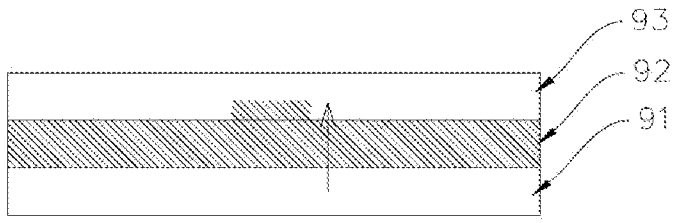
FIG. 4 is a schematic diagram of tattoo transfer paper of the printer according to one embodiment of the present disclosure.

As shown in FIG. 4, in the embodiment, the tattoo transfer paper 9 comprises an interleaving paper layer 91, a transfer paper layer 92, and a base paper layer 93. The interleaving paper layer 91, the transfer paper layer 92, and the base paper layer 93 are disposed in sequence. The interleaving paper layer 91 is film paper or ordinary paper with a certain protective function. The transfer paper layer 92 has dye on one side facing the base paper layer 93. When the tattoo transfer paper 9 is heated by the print head 1, the dye in the transfer paper layer 92 is transferred to the base paper layer 93. One side of the base paper layer 93 facing the transfer paper layer 92 is an oily side to facilitate removal of a pattern thereon and facilitate a user to transfer the pattern onto the skin.

Figure 1:
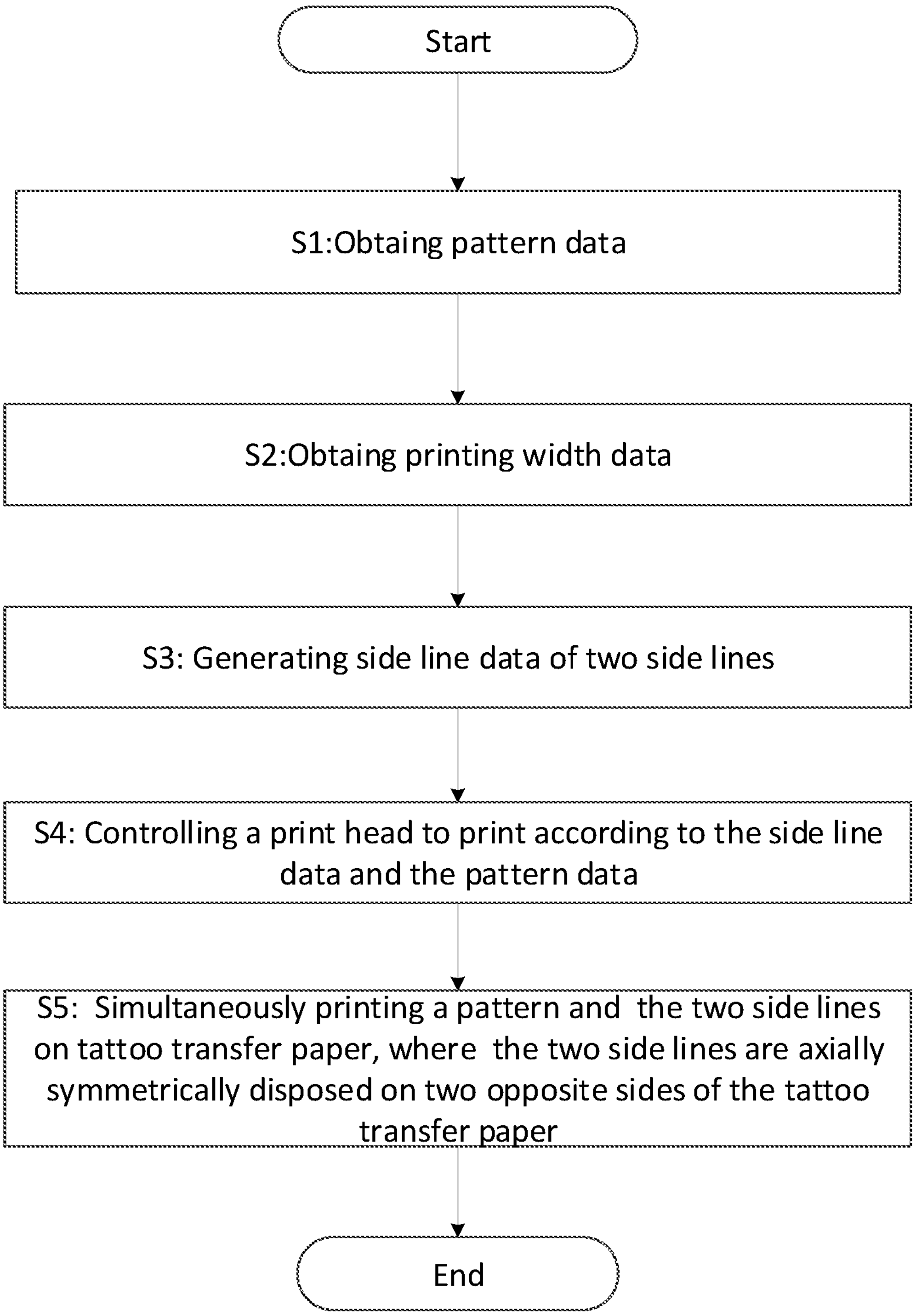
FIG. 1 is a flow chart of a thermal transfer printing method according to one embodiment of the present disclosure.

As shown in FIG. 1, the thermal transfer printing method comprises steps S1-S5.

The step S1 comprises acquiring pattern data. The pattern data is generated by identifying a required image file. The required image file is read from the memory of the operating system, or the required image file is sent by the user from the mobile phone or other terminal device and obtained by the operating system through the wireless module.

The step S2 comprises obtaining printing width data.

Since the tattoo transfer paper may be in different sizes, it is necessary to obtain the printing width data consistent with a width of tattoo transfer paper to be printed to ensure that a target pattern (i.e., the pattern mentioned above) and the two side lines are printed accurately. The printing width data may be obtained by keying in data or signals received by the wireless module. After the user selects one of predetermined printing widths by pressing a physical button or a virtual button on the printer, the operating system obtains input data. Alternatively, after the user selects a print size of the target pattern through programs of the mobile phone or other terminal device. Then the terminal device sends a signal to the wireless module of the printer, and the operating system obtain the signal and identify corresponding print width data.

Of course, there is no necessary sequence relationship between the steps of obtaining the pattern data and obtaining the printing width data. The thermal transfer printing method where the operating system first obtains the pattern data and then obtains the printing width data, and the thermal transfer printing method where the operating system obtains the printing width data first and then obtains the pattern data, are both within the protection scope of the present disclosure.

The step S3 comprises generating side line data of the two side lines. In the embodiment, in three printing situations shown in FIGS. 5-7, the side line data is only associated with the printing width data and is not associated with the pattern data.

The step S4 comprises controlling a print head to print according to the side line data and the pattern data.

The step S5 comprises respectively printing the two side lines on two opposite sides of the base paper layer of the tattoo transfer paper according to the side line data and printing the pattern on the base paper layer according to the pattern data. The two side lines are axially symmetrically disposed When the step S5 is completed, printing of the tattoo transfer paper is completed. In addition to printing the target pattern on the base paper layer of the tattoo transfer paper, the two side lines are also printed on two opposite sides of the target pattern along a width direction thereof.

Figure 5:
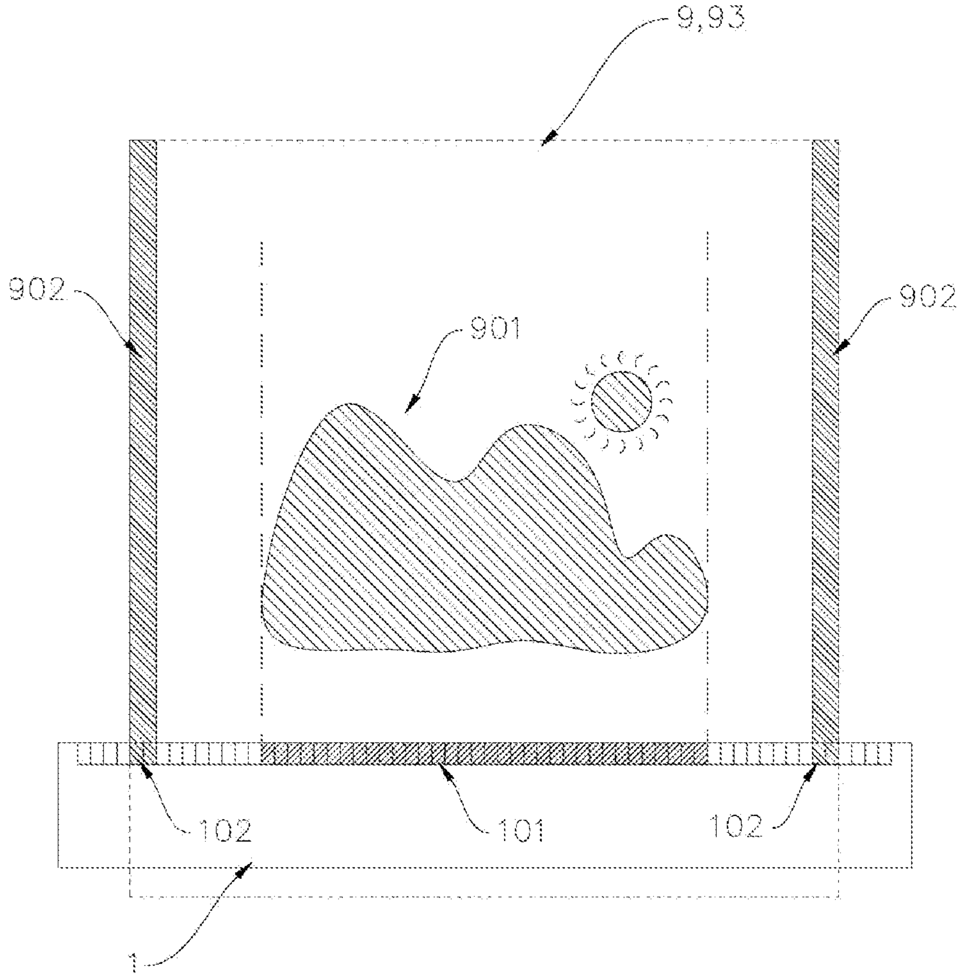
FIG. 5 is a schematic diagram of a first embodiment of the tattoo transfer paper printed by the thermal transfer printing method of the present disclosure.

Referring to a first printing situation shown in FIG. 5, the pattern 901 to be printed comprises a mountain and sun, and the two side lines 902 to be printed are two straight side lines completely overlapping edges of the two opposite sides, along a width direction, of the base paper layer 93. The two side lines 902 have same width and are axially symmetrically disposed. In addition, it should be noted that the two side lines 902 and the pattern 901 are always spaced apart from each other.

First, after obtaining the pattern data of the pattern 901 and the printing width data corresponding to the tattoo transfer paper 9, the operating system determines the heating pieces 10 needed to be worked next and heating rules of the heating pieces 10 needed to be worked. Especially, a printing effectiveness of the two side lines 902 disposed along the width direction of the tattoo transfer paper 9 is directly related to the printing width data.

In the embodiment, the heating pieces 10 corresponding to the pattern 901 are defined as a first heating pieces group 101, and the heating pieces 10 corresponding to the two side lines 902 are defines as two second heating pieces group 102. The heating pieces 10 of the two second heating pieces groups 102 are disposed axially symmetrically on two sides of the print head 1.

However, since the two side lines 902 printed in the embodiment are two straight side lines completely overlapping the edges of the two opposite sides, along the width direction, of the base paper layer 93. Therefore, when executing the step S4, the operating system needs to control the two second heating pieces groups 102 to always work from a start of printing to an end of printing.

Although two side lines 902 are ultimately formed on the two opposite sides of the tattoo transfer paper along the width direction, the two side lines 902 are actually inevitable by-products of implementing the thermal transfer printing method of the present disclosure. The two side lines 902 are not served as the pattern to be transferred onto the skin of the user. The present disclosure actually uses the two side lines 902 to generate symmetrical, continuous, and uniform forces on the two opposite sides of the tattoo transfer paper during a pattern transfer process of the printing process.

The print head 1 heats up and transfers heat to two opposite sides of the tattoo transfer paper 9, thereby melting dye and attaching the dye to two opposite sides of the pattern 901 printed on the base paper layer 93. During the printing process, symmetrical and uniform forces are continuously formed on the two opposite sides of the tattoo transfer paper 9, and the symmetrical and uniform forces fully resist an uneven force formed by printing of the pattern 901 to ensure that the pattern 901 printed on a middle of the tattoo transfer paper 9 is clearly developed and ensure that the forces on the two opposite sides of the tattoo transfer paper 9 are balanced, so that stress between the transfer paper layer 92 and the base paper layer 93 of the tattoo transfer paper 9 has good uniformity. The thermal transfer printing method avoids generation of the wrinkles of the tattoo transfer paper 9 after printing, ensures that the pattern 901 is completely restored when transferring the pattern 901 onto the skin. In the embodiment, each of the two side lines printed by the present disclosure may be continuous or discontinuous, or may be formed into a vertical column with patterned content.

Figure 6:
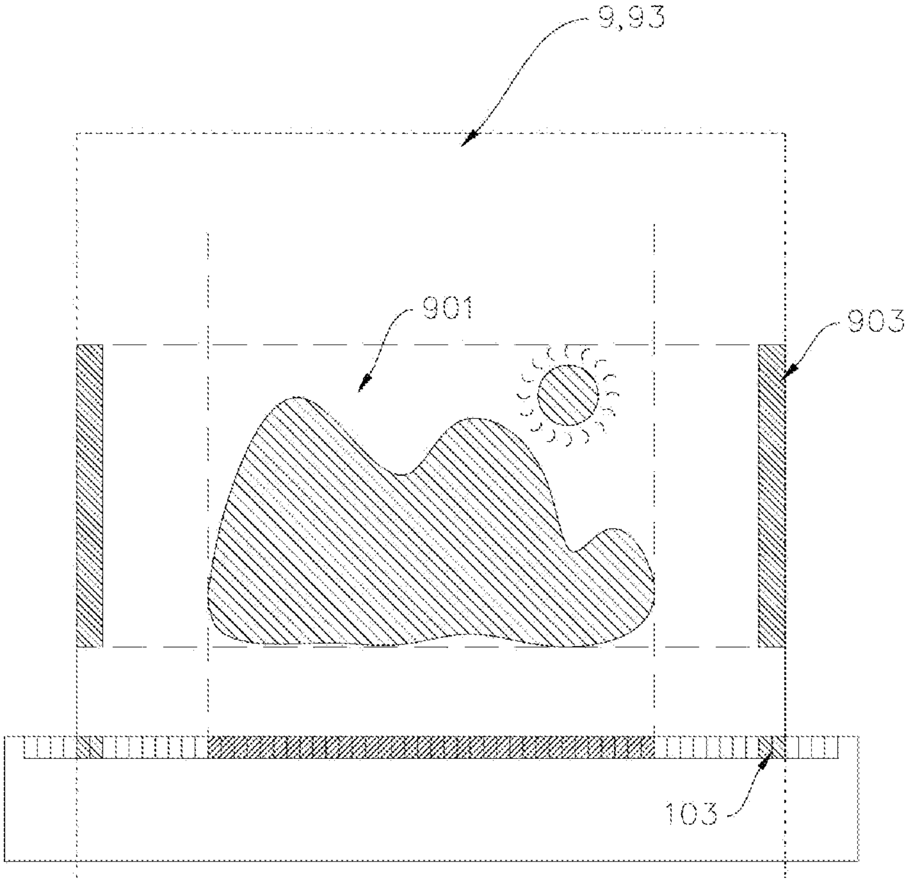
FIG. 6 is a schematic diagram of a second embodiment of the tattoo transfer paper printed by the thermal transfer printing method of the present disclosure.

Referring to a second printing situation shown in FIG. 6, the two side lines 903 finally formed do not completely overlap the edges of the two opposite sides of the tattoo transfer paper 9, and starting points of the two side lines 903 are consistent with a starting point of the pattern 901. In this way, when the step S4 is executed, the two second heating pieces groups 102 corresponding to the two side lines 903 and the first heating pieces group 101 corresponding to the pattern 901 start heating operations and end the heating operations at the same time.

The second printing situation also realize a good anti-wrinkle effect. Since wrinkles are commonly caused by uneven forces when printing the pattern, it is only necessary to ensure that the two side lines are printed with the pattern at the same time during the printing process, and the forces formed when printing the two side lines prevent generation of the wrinkles.

Figure 7:
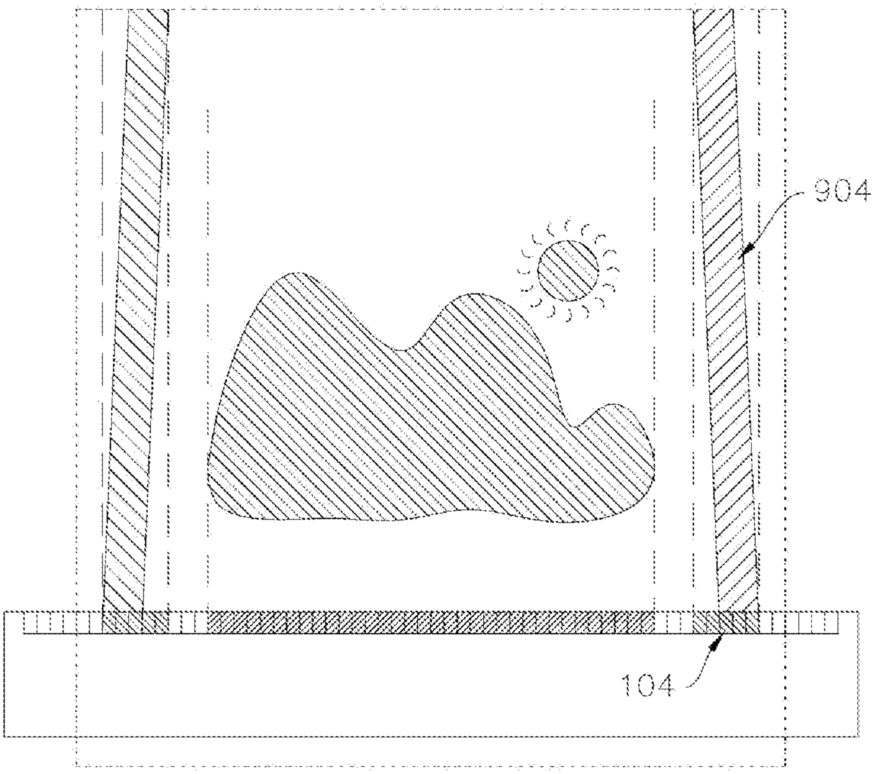
FIG. 7 is a schematic diagram of a third embodiment of the tattoo transfer paper printed by the thermal transfer printing method of the present disclosure.

Referring to a third printing situation shown in FIG. 7, the two side lines 904 are at a certain distance from the edges of the two opposite sides of the tattoo transfer paper 9, and the two side lines 904 are inclined lines wider than the two side lines 904 shown in FIGS. 5 and 6. In addition, the second pieces groups 104 corresponding to the two side lines 904 contains more heating pieces.

In the three printing situations shown in FIGS. 5-7, the two side lines finally formed on the tattoo transfer paper 9 are axially symmetrically disposed, and the two side lines are always spaced apart from the pattern. In order to realize above printing effect, when executing the step S4, it is necessary to make the heating pieces arranged symmetrically on two sides of the print head 1 work. Further, the heating pieces, corresponding to the side line data, of the print head are always spaced apart from the printing head, corresponding to the pattern data, of the print head.

Furthermore, the greater the width of each of the two side lines, the greater the force generated during the printing process of the two side lines to prevent the generation of the wrinkles. However, the greater the width of each of the two side lines, the closer the two side lines is to the pattern, and the greater an impact on the transferring of the pattern onto the skin of the user. For this reason, if the width of each of the two side lines is maximized while ensuring a certain distance from the pattern, a better anti-wrinkle effect is realized without affecting a pattern transference. Therefore, in other embodiments, when executing the step S3 to generate the side line data, in addition to generating the side line data according to the printing width data, the side line data is also generated according to the pattern data. Furthermore, side line interval data (i.e., intervals between the pattern and the two side lines) is pre-stored. After obtaining the pattern data, a remaining width value is calculated based on the printing width data, the pattern data, and the side line interval data, and then the remaining width value is used to generate the side line data and determine the two second heating pieces groups that need to work. In this way, two widest side lines can be printed without affecting transferring of the pattern onto the skin of the user. During the printing process, more sufficient anti-wrinkle forces are generated Furthermore, in some embodiments, extending directions of the two side lines are consistent with a paper printing direction.

Furthermore, when the side line interval data is fixed and a width of the pattern is too large, it may cause a problem of too small of the width of each of the two side lines. Therefore, after the remaining width value is obtained according to the printing width data, the pattern data, and side line interval data, it is also necessary to determine whether the remaining width value is less than a predetermined remaining width value. If yes, generating the side line data according to the predetermined remaining width value. Alternatively, after generating the side line data of the two side lines according to the predetermined remaining width value, the pattern may be scaled down until the intervals between the pattern and the two side lines reaches the above-mentioned side line interval data.

The readable storage medium of the present disclosure is any form of storage medium read by a computer processor of the computer. The readable storage medium comprises, but is not limited to a non-volatile memory, a volatile memory, a ferroelectric memory, etc. The computer programs are stored on the readable storage medium. When the computer processor of the computer reads and executes the computer programs stored in the memory, the steps of the thermal transfer printing method described above are allowed to be implemented.

The computer programs comprise computer program codes. The computer program codes are in a source code form, an object code form, an executable file form, or other intermediate form, etc. The readable storage medium may comprise any entity or device capable of carrying the computer program codes, a recording medium, a USB flash drive, a mobile hard disk, a magnetic disk, an optical disk, a computer memory, a read-only memory (ROM), a random access memory (RAM), electrical carrier signals, telecommunications signals, and software distribution media, etc. It should be noted that content contained in the readable storage medium is allowed to be appropriately increased or decreased according to requirements of legislation and patent practice in a specific jurisdiction. For instance, in some jurisdictions, according to the legislation and patent practice, the readable storage medium does not comprise the electrical carrier signals and the telecommunications signals.

Finally, it should be emphasized that the above embodiments are only optional embodiments of the present disclosure and are not intended to limit the present disclosure. For those skilled in the art, the present disclosure may have various changes and modifications. Any modifications, equivalent replacements, improvements, etc. made within the spirit and principles of the present disclosure shall be included in the protection scope of the present disclosure.

What is claimed is:

1. A thermal transfer printing method for tattoo transfer paper, comprising steps:

acquiring pattern data;

obtaining side line data of two side lines; and controlling a print head to print according to the side line data and the pattern data, wherein the two side lines are axially disposed on two opposite sides of a base paper layer of the tattoo transfer paper for balancing tension of the tattoo transfer paper during printing to prevent wrinkles of the tattoo transfer paper, so as to print a target pattern on the base paper layer of the tattoo paper and to print two side lines spaced apart from the target pattern on both sides of the width of the base paper layer.

2. The thermal transfer printing method for tattoo transfer paper according to claim 1, wherein the step of obtaining the side line data of the two side lines comprises: obtaining printing width data, and generating the side line data of the two side lines according to the printing width data.

3. The thermal transfer printing method for tattoo transfer paper according to claim 1, wherein the step of obtaining the side line data of the two side lines comprises: obtaining printing width data, and generating the side line data of the two side lines according to the printing width data and the pattern data.

4. The thermal transfer printing method for tattoo transfer paper according to claim 1, wherein in the step of controlling the print head to print according to the side line data and the pattern data, heating pieces, corresponding to the side line data, of the print head are always spaced apart from heating pieces, corresponding to the pattern data, of the print head.

5. The thermal transfer printing method for tattoo transfer paper according to claim 2, wherein the step of controlling the print head to print according to the side line data and the pattern data comprises controlling heating pieces, corresponding to the side line data, of the print head to always work.

6. The thermal transfer printing method for tattoo transfer paper according to claim 2, wherein in the step of controlling the print head to print according to the side line data and the pattern data comprises controlling heating pieces disposed symmetrically on two sides of the print head to work according to the side line data.

7. The thermal transfer printing method for tattoo transfer paper according to claim 1, wherein the two side lines are axially symmetrically disposed.

8. The thermal transfer printing method for tattoo transfer paper according to claim 7, wherein the two side lines are straight lines respectively overlapping edges of the two opposite sides of the base paper layer of the tattoo transfer paper.

9. A printer, comprising: a processor; wherein the processor is configured to implement the thermal transfer printing method for tattoo transfer paper according to claim 1 by executing computer programs stored in a memory.

10. A readable storage medium, comprising computer programs stored therein; wherein the computer programs are executed by a processor to implement the thermal transfer printing method for tattoo transfer paper according to claim 1.

11. A thermal transfer printing method for tattoo transfer paper, comprising steps:

acquiring pattern data;

obtaining printing width data of the tattoo transfer paper, and obtaining side line data of two side lines according to the printing width data and the pattern data; and controlling a print head to print according to the side line data and the pattern data, wherein the two side lines are axially symmetrically disposed on two opposite sides of a base paper layer of the tattoo transfer paper for balancing tension of the tattoo transfer paper during printing to prevent wrinkles of the tattoo transfer paper, and heating pieces of the print head corresponding to the side line data are always spaced apart from heating pieces corresponding to the pattern data, and a target pattern printed on the base paper layer of the tattoo paper and two side lines printed spaced apart from the target pattern on both sides of the width of the base paper layer.

12. The thermal transfer printing method for tattoo transfer paper according to claim 1, wherein the printing width data is obtained by receiving a signal sent by a terminal device or by a manual input on the printer.

13. The thermal transfer printing method for tattoo transfer paper according to claim 12, wherein the step of controlling the print head to print according to the side line data and the pattern data comprises controlling heating pieces, corresponding to the side line data, of the print head to always work.

14. The thermal transfer printing method for tattoo transfer paper according to claim 12, wherein in the step of controlling the print head to print according to the side line data and the pattern data comprises controlling heating pieces disposed symmetrically on two sides of the print head to work according to the side line data.

15. The thermal transfer printing method for tattoo transfer paper according to claim 11, wherein the two side lines are printed on the base paper layer after the pattern is printed on the base paper layer of the tattoo transfer paper.

16. The thermal transfer printing method for tattoo transfer paper according to claim 15, wherein the two side lines are straight lines respectively overlapping edges of the two opposite sides of the base paper layer of the tattoo transfer paper.

17. The thermal transfer printing method for tattoo transfer paper according to claim 11, wherein the spacing between the heating pieces corresponding to the side line data and the heating pieces corresponding to the pattern data is a predetermined value, and the predetermined value is set according to the specification of the tattoo transfer paper.

18. The thermal transfer printing method for tattoo transfer paper according to claim 11, wherein side line interval data is pre-stored, a remaining width value is calculated based on the printing width data, the pattern data and the side line interval data, and then the remaining width value is used to generate the side line data.

19. The thermal transfer printing method for tattoo transfer paper according to claim 11, wherein if the remaining width value is less than a predetermined remaining width value, the side line data is generated according to the predetermined remaining width value, or the pattern is scaled down until the intervals between the pattern and the two side lines reaches the side line interval data.

20. The thermal transfer printing method for tattoo transfer paper according to claim 11, wherein heating pieces corresponding to the side line data are defined as two second heating pieces groups, heating pieces corresponding to the pattern data are defined as a first heating pieces group, and the two second heating pieces groups are disposed axially symmetrically on two sides of the print head.

* * * * *